United States Patent
Aleksic et al.

(10) Patent No.: US 6,317,525 B1
(45) Date of Patent: *Nov. 13, 2001

(54) METHOD AND APPARATUS FOR FULL SCENE ANTI-ALIASING

(75) Inventors: Milivoje M. Aleksic; Indra Laksono, both of Richmond Hill; James Doyle, Thornhill, all of (CA)

(73) Assignee: ATI Technologies, Inc., Ontario (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/026,866

(22) Filed: Feb. 20, 1998

(51) Int. Cl.$^7$ ........................................ G06K 9/32
(52) U.S. Cl. .................... 382/299; 345/530; 345/611; 345/613
(58) Field of Search ................................. 382/299, 162, 382/266, 267, 268, 269; 345/418, 422, 541, 424, 530, 531, 441, 443, 533, 544, 549, 536, 537, 547, 611, 613, 614

(56) References Cited

U.S. PATENT DOCUMENTS

| | | | |
|---|---|---|---|
| 4,967,392 | * 10/1990 | Werner et al. | 364/900 |
| 5,278,949 | * 1/1994 | Thayer | 395/126 |
| 5,287,438 | * 2/1994 | Kelleher | 395/132 |
| 5,313,567 | * 5/1994 | Civanlar et al. | 395/124 |
| 5,764,228 | * 6/1998 | Baldwin | 345/344 |
| 5,781,176 | * 7/1998 | Rey et al. | 345/147 |
| 5,870,097 | * 2/1999 | Snyder et al. | 345/426 |
| 5,886,701 | * 3/1999 | Chauvin et al. | 345/418 |
| 6,008,813 | * 12/1999 | Lauer et al. | 345/424 |
| 6,049,337 | * 4/2000 | Van Overveld | 345/430 |

* cited by examiner

Primary Examiner—Leo Boudreau
Assistant Examiner—Kanji Patel
(74) Attorney, Agent, or Firm—Vedder, Price, Kaufman & Kammholz

(57) ABSTRACT

An anti-aliasing technique for sampling an image for display on a pixel based display is presented. The image, or set of objects forming an image, is sampled at a resolution higher than the pixel spatial resolution. The resultant multiple sampled values for each pixel are accumulated, and the accumulated value is used to determine an average pixel value that is used for the display of the pixel. To minimize memory requirements, the rendering plane is used to temporarily store a portion of the accumulated value for each pixel. To minimize processing, the multiple of samples per pixel is a power of 2, and the portion of the accumulated value that is stored in the rendering plane is the most significant bits (MSB) of the accumulated value. Because of the use of a power of 2 as the number of samples, the MSB of the accumulated value is equal to the average of the accumulated value, and therefore the need for an explicit computation of an average for each pixel is eliminated. Because the rendering plane is used to store this average of the accumulated value, the explicit process of moving the computed average value to each corresponding pixel location in the rendering plane is also eliminated.

29 Claims, 7 Drawing Sheets

METHOD AND APPARATUS FOR FULL SCENE ANTI-ALIASING

FIELD OF THE INVENTION

This invention relates to the display or printing of images formed by discrete pixels.

BACKGROUND OF THE INVENTION

Computers are known to include processors, memory, and display devices. With ever increasing advances in computer applications, the need for improved display quality continues. Computer displays must be able to present high resolution, high quality images at rapid refresh rates. Video graphic circuits and systems must be able to provide the data for such displays efficiently and effectively, often within highly competitive cost and compatibility constraints.

Computer displays, and other high resolution display devices such as high definition televisions (HDTV), projectors, printers, plotters, and the like, present an image to the viewer as an array of individual picture elements, or pixels. The individual pixels are each given a specific characteristic, such as the color of the image at the particular pixel's location. The pixels are closely spaced, and the viewer's visual system performs a filtering of the individual pixel color values to form a composite image. If the partitioning of the image into individual pixel elements is performed properly, and the pixels are close enough together, the viewer perceives the displayed array of pixels as a virtually continuous image. Despite the viewer's visual filtering, the viewer remains sensitive to aberrations in the image, and video graphic systems must be designed to minimize these aberrations.

If the image is insufficiently sampled, visual aberrations will be produced. A highly detailed image with numerous changes within a short span of points will have a high frequency of change; a blank image has a zero frequency of change. If the frequency of pixel value sampling is less than half the image's frequency of change, aliasing will occur, and visual aberrations will be introduced into the image. That is, not only will the displayed image not contain the detail of the original image, but additional components, not contained in the original image, will be added. In addition to being visually disturbing, the introduction of sampling artifacts, not contained in the original image, can be particularly problematic if the display is used for mapping or medical applications (x-rays, MRI scans, etc.)

Aliasing will occur whenever the sampling rate is less than half the highest frequency change in the image. Traditionally, the pixel sampling rate is equal to the pixel spatial frequency. That is, if there are 640 pixels per line of display, a full screen image will be sampled at 640 points across its horizontal dimension. If the image being sampled has a highest frequency that is greater than twice the pixel sampling rate, then either the image highest frequency must be reduced, or the pixel sampling rate must be increased. These techniques, of reducing the image frequency, or increasing the pixel sampling frequency, are termed "anti-aliasing" techniques. Filtering the image to remove the high frequency components before the image is sampled for display reduces the image highest frequency. The pixel sampling rate can be increased by increasing the number of pixels per line of display, i.e. by increasing the display resolution, or, by sampling the image at greater than the pixel spatial frequency. High resolution displays are significantly more costly than lower resolution displays, and therefore a preferred alternative is to increase the sampling frequency by obtaining multiple samples of the image for each pixel; that is, by sampling at a subpixel resolution. The value presented to the display as the pixel value corresponding to the image will be the average of the multiple sample values obtained within each pixel.

Two schemes can be used to perform subpixel resolution sampling. Conventionally, in a non-subpixel sampled scheme, the center of the pixel is used as the point at which to sample the pixel value. To effect subpixel sampling, multiple points within each pixel are selected as sampling points, and the image is sampled at each of these points. For example, if the image comprises an object having a particular value, the sampled value will be the value of the object if the pixel lies within the object, or the value of the background if the pixel lies outside the object. To display the pixel, a single value must be assigned. Typically, the single value assigned to a pixel will be the average of the values assigned at each sampled point within the pixel, although other means of forming a representative statistic may be employed, such as the root mean square (RMS) of the sampled values. In this way, pixels which lie on the border of objects, such that some of the sub-pixel sampled values contain the object value, and some contain the background value, will be assigned an average value of the subpixel sampled values, producing a smoothing, or blending, at the transition, thereby effectively reducing the high frequency components of the image.

Another method of subpixel sampling is to repeatedly place the image at slightly different locations relative to the pixels; typically the locations are offset by a fraction of the pixel size from the original placement of the object. The image is sampled at each of these offset placements using the conventional technique of obtaining a single sample per pixel. Each pixel will then have one sample value for each offset placement. These pixel values corresponding to each offset placement are averaged to form a single pixel value to be displayed. This averaging based on multiple offset placements will produce the same smoothing, or blending, of edges within the image as discussed above.

Sampling at a subpixel resolution, using either the direct subpixel sampling or the object offset sampling provides an effective anti-aliasing solution, but requires additional processing and memory resources. To minimize memory requirements, an accumulated value of the multiple values per pixel is stored, rather than the individual sampled values. To provide an average pixel value having the same quality of a non-subpixel sampled value, each of the subpixel sampled values must have the same level of precision as the non-subpixel sampled value. If the non-subpixel sampled value has a precision of 8 bits, each of the subpixel samples must have 8 bits. If two samples are taken per pixel, the accumulated pixel value must have 9 bits to contain the sum of the two 8 bit values; if four samples are taken, 10 bits; etc.

For example, in conventional computer display technology, the pixel value comprises a set of values (16, 24, or 32 bit words) corresponding to the value of the Red, Green, and Blue (RGB) components of each pixel. These pixel values are stored in a portion of memory termed the rendering plane. Because the degree of precision for the accumulated pixel value is greater than the degree of precision for the rendered pixel value, more memory is required to contain the accumulated pixel value than that required to contain the actual pixel value for each pixel comprising the display. That is, if the pixel value is a 16 bit word, the accumulated pixel value will require an even larger word for each pixel. If two megabytes are required to store each pixel value in a rendering plane, then more than 2 megabytes will be required to store the accumulated pixel value.

In addition to the significant memory resources required to contain the accumulated pixel values, a significant amount of processing resources will be required to average the accumulated pixel value and store the resultant into the rendering plane. Consider, for example, a common 640×480 pixel display. For each of the 307,200 (640*480) pixels, the accumulated pixel value must be recalled from the accumulated pixel value memory area, then divided by the number of samples taken per pixel, then stored to the rendering plane memory area. With an ever increasing need to improve video graphic processing, such a large amount of processing limits the application of this sub-pixel sampling anti-aliasing technique.

A need exists for an anti-aliasing technique that does not require a substantial memory increase. A need also exists for an anti-aliasing technique that does not require a significant amount of processing to compute and store the anti-aliased pixel values into the rendering plane.

DETAILED DESCRIPTION OF PREFERRED EMBODIMENTS

Generally, the invention provides a method and apparatus for an anti-aliasing process that minimizes the memory requirements associated with subpixel resolution sampling and minimizes the processing required to determine and store the appropriate pixel value to be displayed. This may be accomplished by accumulating multiple pixel values associated with subpixel sampling and utilizing the existing rendering plane memory to store a portion of the accumulated value, and another part of memory for the remaining portion of the accumulated value. In an embodiment of this invention, the subpixel resolution is a power of two, and the most significant bits of the accumulated value is stored in the rendering plane, thereby eliminating the averaging process typically associated with subpixel resolution sampling.

Figure 1:
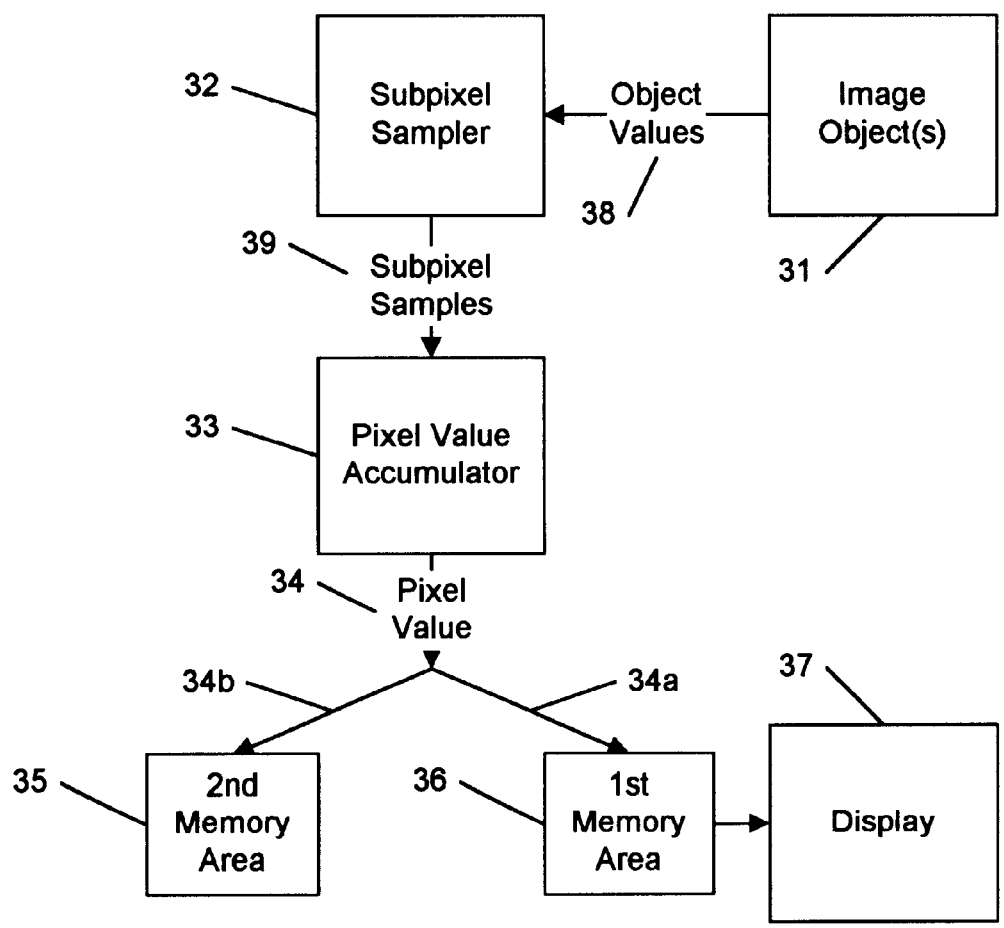
FIG. 1 illustrates a video processing system for accumulating and storing pixel values for renderings of an object at subpixel resolution in accordance with this invention.

The present invention can be more fully described with reference to FIG. 1. FIG. 1 illustrates the overall structure of a video processing system that includes a subpixel sampler 32, pixel value accumulator 33, first and second memories 35 and 36, and a display 37.

The subpixel sampler 32 samples an image object 31 to obtain a set of samples associated with each pixel to be displayed. Each image object 31 has an associated location relative to the pixels to be displayed, such that each pixel area corresponds to an area of the object located at the associated pixel location. The sampling can be effected by directly sampling the image object at multiple points within the area of a pixel, or by offsetting the image object relative to the pixels by multiple subpixel sized offsets. The subpixel samples are taken substantially within the object area corresponding to each pixel area. The image object 31 may be a single object, or a set of multiple objects forming a scene. The image object 31 may also be sets of object elements, for example polygon shapes, such as a triangles. Each of these object elements may or may not be included in a resultant scene, depending upon each objects relation to each other and in relation to the particular view being rendered.

The pixel value accumulator 33 accumulates the multiple samples 39 associated with each pixel and forms an accumulated pixel value 34 for each pixel. Part 34a of each accumulated pixel value 34 is stored in a first memory area 36, and part 34b of each accumulated pixel value 34 is stored in another memory area 35.

Preferably, the first memory area 36 is the rendering plane, which is the memory area conventionally used to store the pixel value in the format established for access via a display device 37. The format used to store the pixel value for rendering in the first memory area 36 is insufficient to contain the accumulated value of the multiple subpixel samples without a degradation in quality. By using the rendering plane memory to store that portion of the accumulated value that fits into the existing rendering plane, only the excess of the accumulated value need be allocated additional memory space. Thus, in accordance with this invention, the additional memory required to effect a subpixel sampling can be minimized.

As will be discussed further, by controlling the number of subpixel samples and by appropriately selecting the portion of the accumulated value that is to be stored, the computation and storage requirements for computing and storing the average of the accumulated value can also be minimized.

Figure 2:
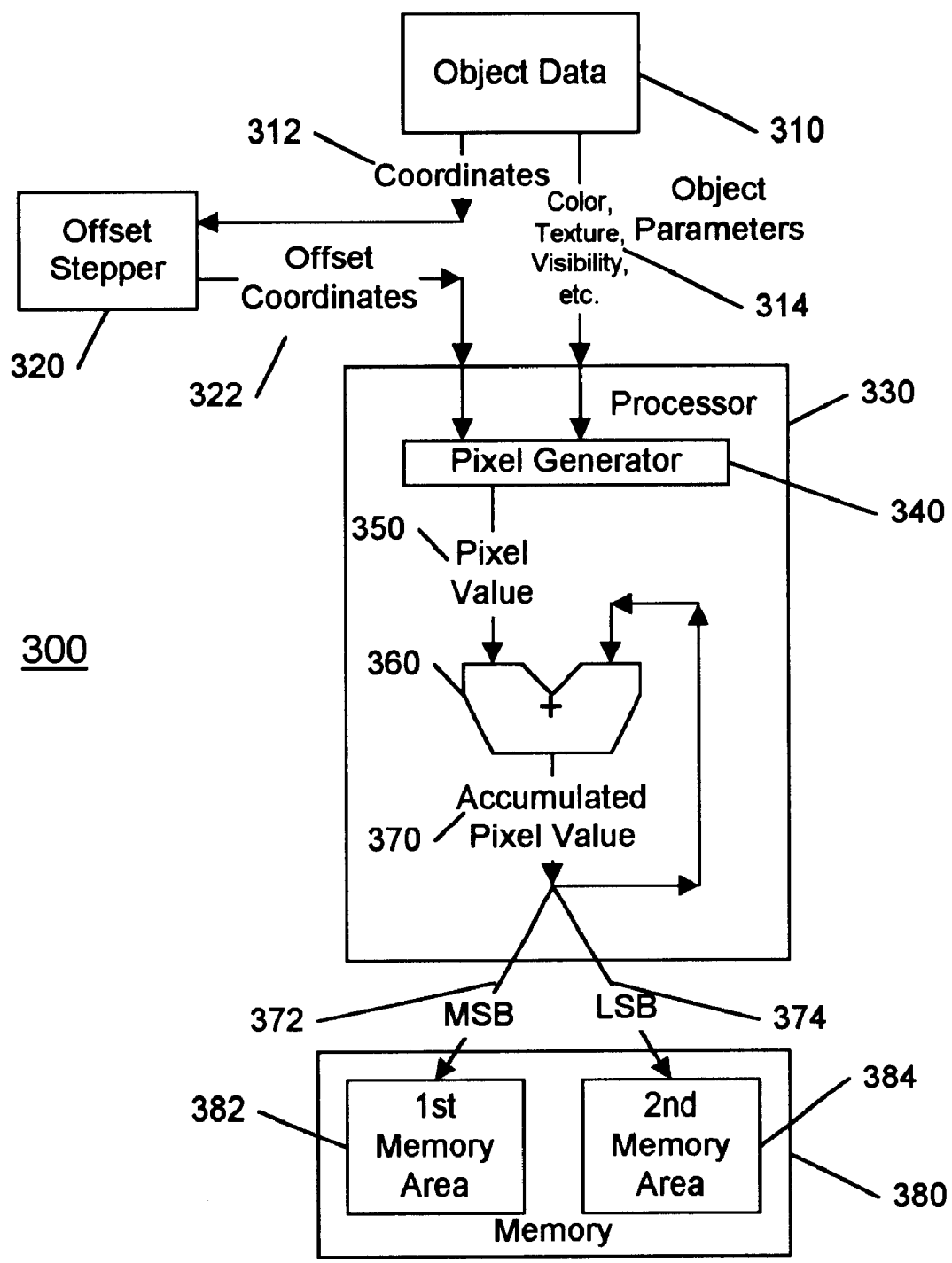
FIG. 2 illustrates another video processing system for accumulating and storing pixel values for renderings of an object at subpixel resolution in accordance with this invention.

FIG. 2 illustrates a video processing system 300 that includes a stepper 320, a processor 330, and memory 380. Block 310 contains the data associated with the object to be displayed. The object data includes the coordinates 312 at which the object is to be displayed, and the object parameters 314 that determine how the object will appear. As shown, these object parameters 314 include such items as color, texture, visibility, etc. that are used to determine the pixel value 350 for each pixel affected by the object. In an example application, the object parameters 314 could be a direct representation of the image, in JPEG format, and a scaling factor for sizing the image to the display, or a portion of the display. The coordinates 312 could be the desired location of the origin of the image on the display. In an image generation program, the object parameters 314 could be the starting and ending colors at the vertices of a polygon, and the coordinates 312 could be the desired display location for each of the vertices. The coordinates 312 may also be implicit, for example, a reference to a "next" tile, or "next" line, or a random placement.

The offset stepper 320 transforms the coordinates into a set of offset coordinates 322. For example, if there are 8 subpixels within a pixel, each coordinate 312 will result in a set of 8 offset coordinates 322. If the coordinates 312 form a group, for example a group of vertices forming a polygon, the stepper 320 will generate a set of 8 groups, wherein each of the vertices within each group are offset. These offset coordinates 322, in combination with the object parameters 314, result in a set of descriptions for displaying the object at each offset from the original coordinate 312. Typically, the offset coordinates will be uniformly distributed about the original coordinate 312, within one pixel height and width. For example, with 8 subpixels, the offset coordinates may be spaced at each quarter pixel width, and each half pixel height.

The processor 330, which may be a microprocessor, digital signal processor, CPU, etc. utilizes the pixel generator 340 and accumulator 360 to generate the pixel values to be displayed corresponding to the image being placed at each of the offset locations. Corresponding to each of the offset coordinates 322, a pixel value 350 is generated for each pixel affected by the object; as each offset is processed, the pixel value 350 is added to the accumulated pixel value 370. The accumulated pixel value is initially set to 0. After the entire set of offsets is processed, the accumulated pixel value 370 corresponding to each pixel will contain the sum of the pixel values produced by each offset of the object.

The accumulated pixel value 370 is stored for each pixel, so that when the object is rerendered at each subsequent offset, the accumulated pixel value 370 for that particular pixel is available to be added to the new pixel value 350. Two distinct areas of memory 380, a first memory area 382, and a second memory area 384, are used to store the accumulated value. To minimize the additional amount of memory used to store the accumulated pixel value, the portion of memory 380 traditionally allocated as the rendering plane is used as the first memory area 382 to store a portion 372 of the accumulated pixel value 370. The second memory area 384 is used to store the remaining portion 374 of the accumulated pixel value 370. The visibility plane, or z-plane, of a conventional display system may be used as the second memory area 384. The visibility plane is conventionally used to determine which object is in front of another, so that objects obscured by other objects are not rendered. Assuming that excess bits are available in the visibility plane, storing the remaining portion 374 of the accumulated pixel value 370 in this plane provides for memory access efficiency, because the visibility plane is accessed for visibility data as each pixel is processed. If the visibility plane does not have sufficient excess capacity to contain the remaining portion 374 of the accumulated pixel value 370, any other available memory area may be utilized.

Note that by storing a portion 372 of the accumulated pixel value 370 in the rendering plane, the only additional memory required to effect subpixel resolution sampling in accordance with this invention is the storage of the remaining portion of the accumulated pixel value. Consider for example, the pixel value being a 16 bit word, and the accumulated pixel value requires 18 bits. If the storage of the pixel values requires a 2 megabyte rendering plane, the conventional storage of the accumulated pixel values would require 2.25 megabytes ($2 * {}^{18}\!/_{16}$). By using the rendering plane to store a portion of each accumulated pixel value, 2 megabytes of the 2.25 megabytes required for the storage of the accumulated pixel value would be stored in the rendering plane, and only 0.25 megabytes additional memory would be required to store the remaining portions. Thus, in accordance with this invention, the additional memory required to effect subpixel sampling in this example reduces the memory requirement from 2.25 MB to 0.25 MB, a reduction by almost a factor of 10.

To reduce the processing requirements to compute the average pixel value, the pixel resolution is set to be a power of two. The average of the sum of pixel values can thus be effected by a mere logical shift of the sum. If the subpixel resolution is two, a logical shift of the sum by 1 bit will effect the required divide by 2 function to produce the average. If the subpixel resolution is four, a logical shift of the sum by 2 bits will produce the average, and so on. By choosing a subpixel resolution to be a power of two, the need for performing an explicit division to determine the average pixel value is eliminated.

This invention also provides for an elimination of the above mentioned shift function. If the subpixel resolution is a power of two, the average of the sum will be contained, explicitly, in the most significant bits of the accumulated pixel value. That is, for example, if the accumulated pixel value contains 8 bits, and the subpixel resolution is 4, the upper 6 bits of the accumulated pixel value will explicitly contain the average pixel value. In accordance with this invention, the portion 372 of the accumulated pixel value which is stored in the first memory area 382 will be the most significant bits (MSB) of the accumulated pixel value 370, thereby eliminating the need to perform either a division or a shift of the accumulated pixel value to produce the pixel value to be displayed. Further, by using the rendering plane as the first memory area, the rendering plane will thereby contain the average pixel value, without any further processing or data transfer.

Figure 3:
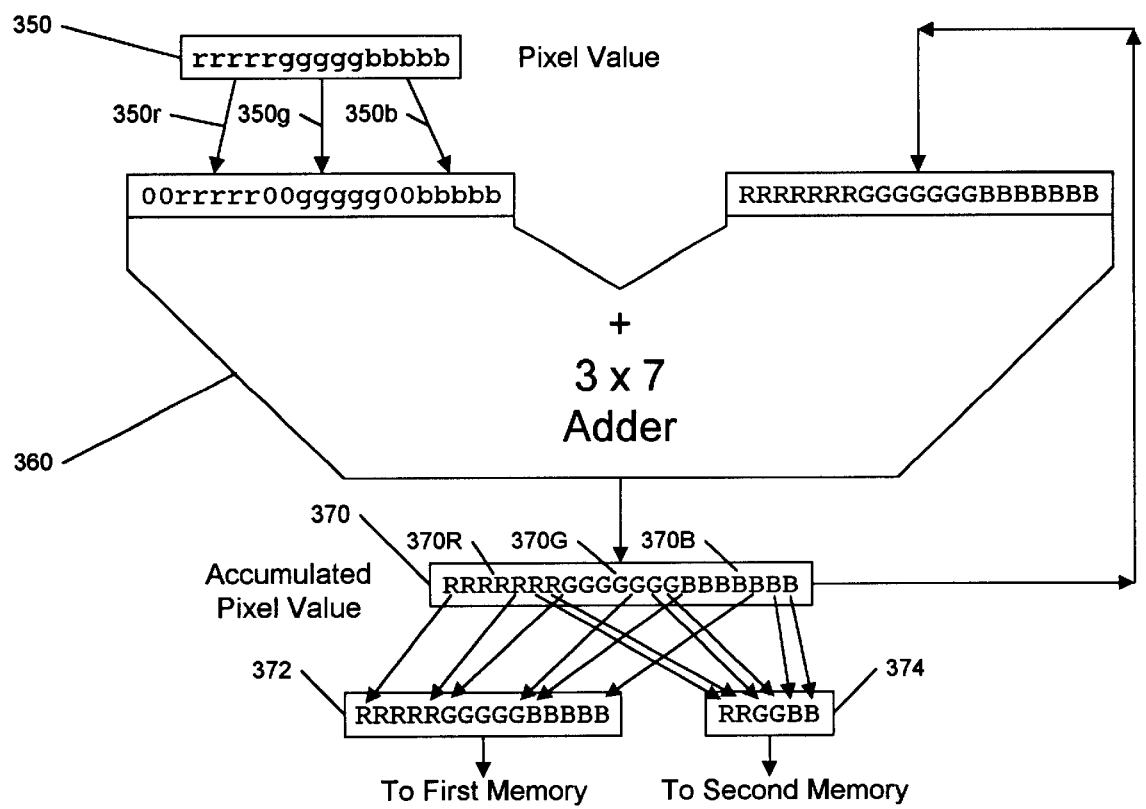
FIG. 3 illustrates an accumulator for accumulating pixel values in accordance with this invention.

If the pixel value comprises subcomponents, such as the red, green, and blue components, the storage of the MSB of the pixel value comprises the storage of the most significant bits of each of these components, in the format conventionally used to store the components. FIG. 3 illustrates a method for accumulating and storing the accumulated pixel value into two memory locations. In the example used for FIG. 3, the pixel value 350 comprises 5 bits of red 350r, green 350g, and blue 350b pixel values, and four sub-pixel samples are taken per pixel. The accumulated pixel value 370 will thus require 7 bits of red 370R, green 370G, and blue 370B pixel values. The accumulator 360 in this example is a 3 by 7 bit adder. Because it is known that the accumulation of four 5 bit values cannot exceed 7 bits, the 3 by 7 bit adder 360 can be a conventional 21 bit adder. As shown, the individual components 350r, 350g, and 350b are provided to the accumulator 360 as the five least significant bits of a trio of 7 bit values, the MSBs of each being zero filled. The accumulator 360 adds the trio of pixel value components to the accumulated pixel value 370, to form a new accumulated pixel value 370. This accumulated pixel value is also a trio of 7 bit components: 370R, 370G, and 370B. The 5 most significant bits of each of the 7 bit components 370R, 370G, and 370B of the accumulated pixel value 370 form the MSB portion 372 of the accumulated pixel value 370 and this MSB portion 372 is stored in the first memory area 382, preferably the rendering plane. The remaining 2 bits of each of the 7 bit components 370R, 370G, and 370B form the LSB portion 374 of the accumulated pixel value 370 and this LSB portion 374 is stored in the second memory area 384, preferably the visibility plane.

Figure 4:
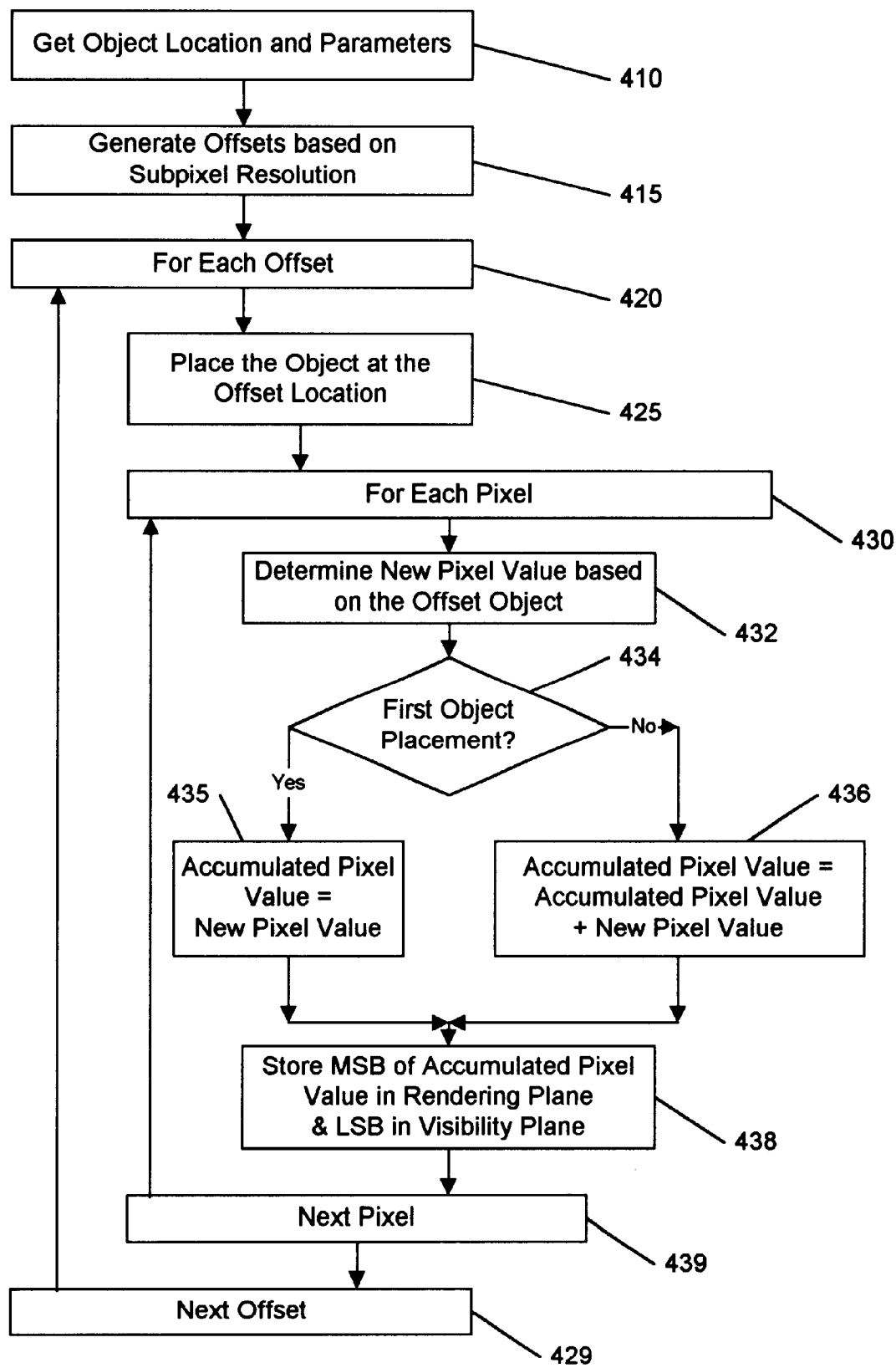
FIG. 4 illustrates a method for accumulating and storing pixel values for renderings of an object at subpixel resolution in accordance with this invention.

FIG. 4 illustrates a flow chart for determining the pixel value by placing an object at multiple sub-pixel locations. The process begins at block 410, where the parameters of the object to be rendered, and the location at which to effect this rendering are obtained. The process then proceeds to block 415, where the offsets are generated, based on the subpixel resolution. For example, if the subpixel resolution is four, oriented in a 2×2 pattern, the set of offsets can be (+¼,+¼), (+¼,−¼), (−¼,¼), and (−¼,−¼). Alternatively, the set of offsets can be (0,0), (½,0), (0,½), and (½,½). The offset parameters in this example are fractions of the pixel size; in practice, all coordinates are suitably upscaled so that integer arithmetic, rather than fractional arithmetic can be utilized. Any set of four offsets can be utilized, but choosing offsets which are uniformly distributed about the pixel area produces the preferred filtering effect. The loop 420–429 iteratively processes the object for each offset. Block 425 places the object at a location corresponding to the original location plus the current offset. The loop 430–439 determines each pixel value resulting from the object being placed at this offset location. At 432, the pixel value is determined. At 434, if this is the first placement of the object, the accumulated value is set equal to this pixel value at 435, otherwise the accumulated value is set equal to the sum of prior accumulated value and this new pixel value at 436. The accumulated value for each pixel is stored, to be available for the next offset placement of the object. In accordance with this invention, at 438, a portion of the accumulated value is stored in the rendering plane, and the remaining portion stored in a different memory area. At 438, the visibility plane is shown as the memory area for storing the remaining portion, but this is optional, as discussed above.

Assuming that the subpixel resolution is a power of two, the portion of the accumulated value stored in the rendering plane is the most significant bits of the accumulated value's components, as discussed above. In this manner, the explicit dividing or shifting of each accumulated pixel value, and the subsequent storage into the rendering plane of each resultant pixel value, is eliminated.

Figure 5:
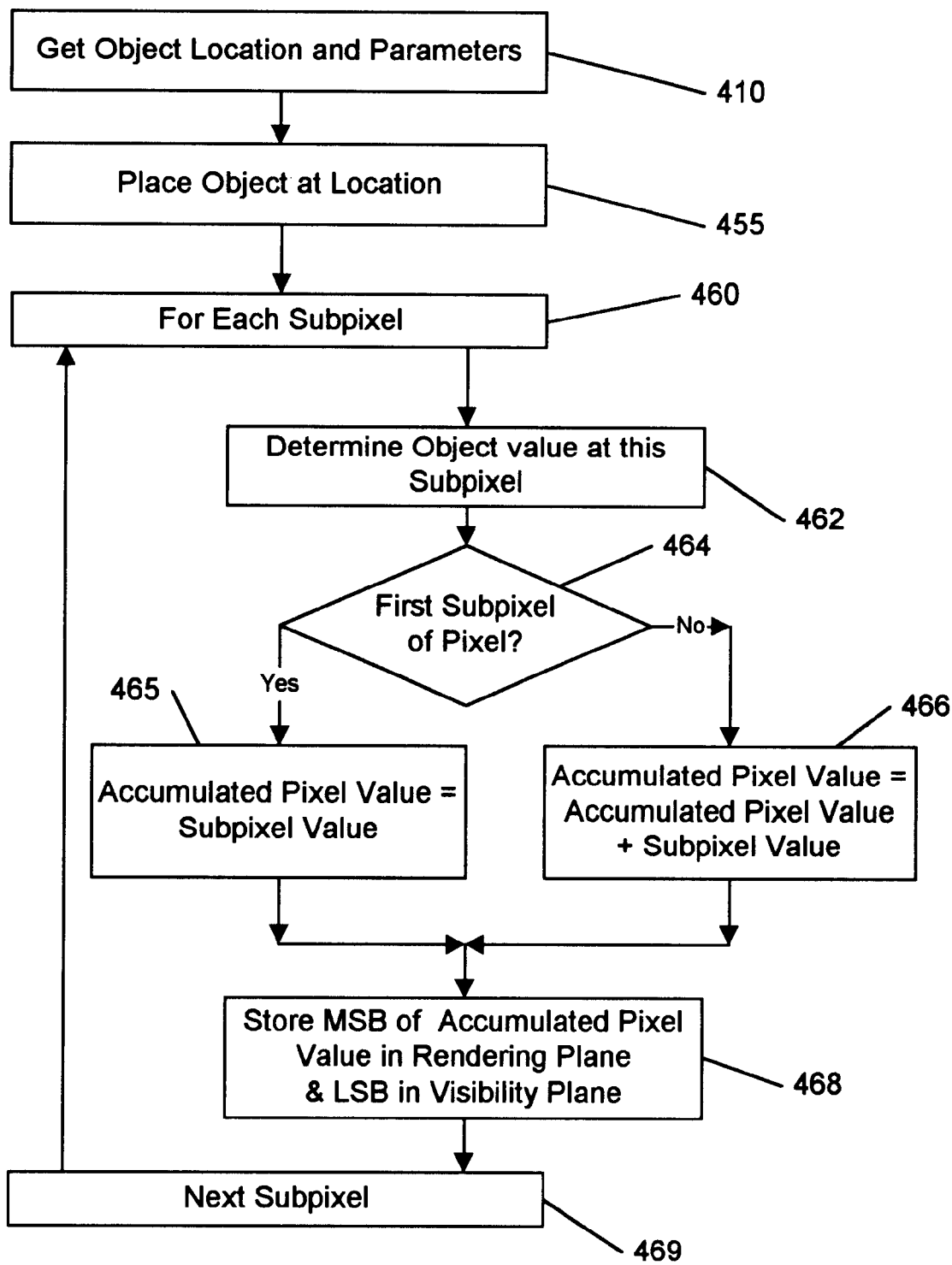
FIG. 5 illustrates another method for accumulating and storing pixel values for renderings of an object at subpixel resolution in accordance with this invention.

FIG. 5 illustrates subpixel sampling of the object. As in FIG. 4, the process starts at block 410, where the parameters of the object and the location at which it is to be placed are obtained. Block 455 effects the placement of the object at the specified location. The loop 460–469 determines the value associated with each subpixel with the object placed at the specified location. That is, for example, using the 2×2 subpixel model above, the loop 460–469 would start at a location offset by minus ¼ of a pixel size in each dimension, then apply an iteration step size of ½ in each dimension. In this manner, the object will be sampled at four points within each pixel, the points being offset by (−¼,−¼), (+¼,−¼), (−¼,+¼), and (+¼,+¼) from the pixel centers. Block 462 determines the value at each subpixel. At 464, if this is the first subpixel within the pixel to be sampled, the accumulated pixel value is set equal to the subpixel value, at 465; otherwise, the accumulated pixel value is set equal to the sum of the prior accumulated pixel value plus this subpixel value, at 466. Block 468 stores a portion of the accumulated pixel value into the rendering plane, as discussed above. Also as discussed above, if the subpixel resolution is a power of two, the portion stored is the MSB of the accumulated pixel value. As would be evident to one of ordinary skill in the art, the use of a subpixel resolution which is a power of two will also provide for a straightforward association of subpixels to pixels. The most significant bits of the subpixel identifier can be used as the pixel identifier; the least significant bits can be used at 464 to determine if this is the first subpixel within the pixel.

The alternative methods shown in FIGS. 4 and 5 produce substantially equivalent results, because the methods shown are complements of each other. Hereafter, for ease of understanding, the offsetting of an object to a set of multiple locations will be the paradigm used to present alternative embodiments. The subpixel sampling complement to each of these embodiments will be readily apparent to one of ordinary skill in the art.

The methods and apparatus discussed thus far can be applied to any pixel based rendering of objects. For example, the object may be a video image from a camera. This video image is sampled at subpixel resolution, either by explicitly sampling the image at a resolution greater than the pixel resolution, or by presenting the image repeatedly, offset by a submultiple of the pixel size.

Alternatively, the object may be a computer generated object or multiple computer generated objects comprising a computer generated scene. The generation of a realistic composite scene, intending to convey three dimensions, requires the determination of which objects are blocked by other objects. In the rendering of each object, the composite scene may contain high frequency changes which will produce aberrations when rendered to a pixel based display. These high frequency changes may occur independent of whether the individual objects are prefiltered to eliminate high frequency changes, because the high frequency changes may occur at the boundaries between objects. In the most straightforward approach to eliminate these aberrations, the entire composite scene is produced, then the scene is filtered as discussed above. This will provide for the desired full scene anti-aliasing filtering. This straightforward approach, however, incurs additional memory resources and processing time, and may not be suitable for the incremental update processes commonly utilized for displaying motion.

In accordance with another aspect of this invention, to effect full screen anti-aliasing without explicitly filtering a composite scene, the visibility of each object at each pixel is determined based upon the object being placed at each offset location, as well as the pixel value corresponding to this offset. As is common in the art, objects are characterized as polygons, the vertices of the polygon defining its shape. At each vertex, the object's parameters such as color, texture, etc. are defined. The corresponding values in the areas between vertices are determined, for example, by a two dimensional linear interpolation algorithm. The vertex characteristics also include a visibility parameter, typically termed the z-axis parameter. This parameter is a measure of the distance of the vertex from a viewing point. If two objects have the same x and y coordinates, the z-axis parameter is used to determine which of the objects is visible. In general, the closer object will prevent the farther object being viewed, although other parameters, such as a transparency (alpha) parameter of the nearer object may allow portions of the farther object to be viewed.

Figure 6:
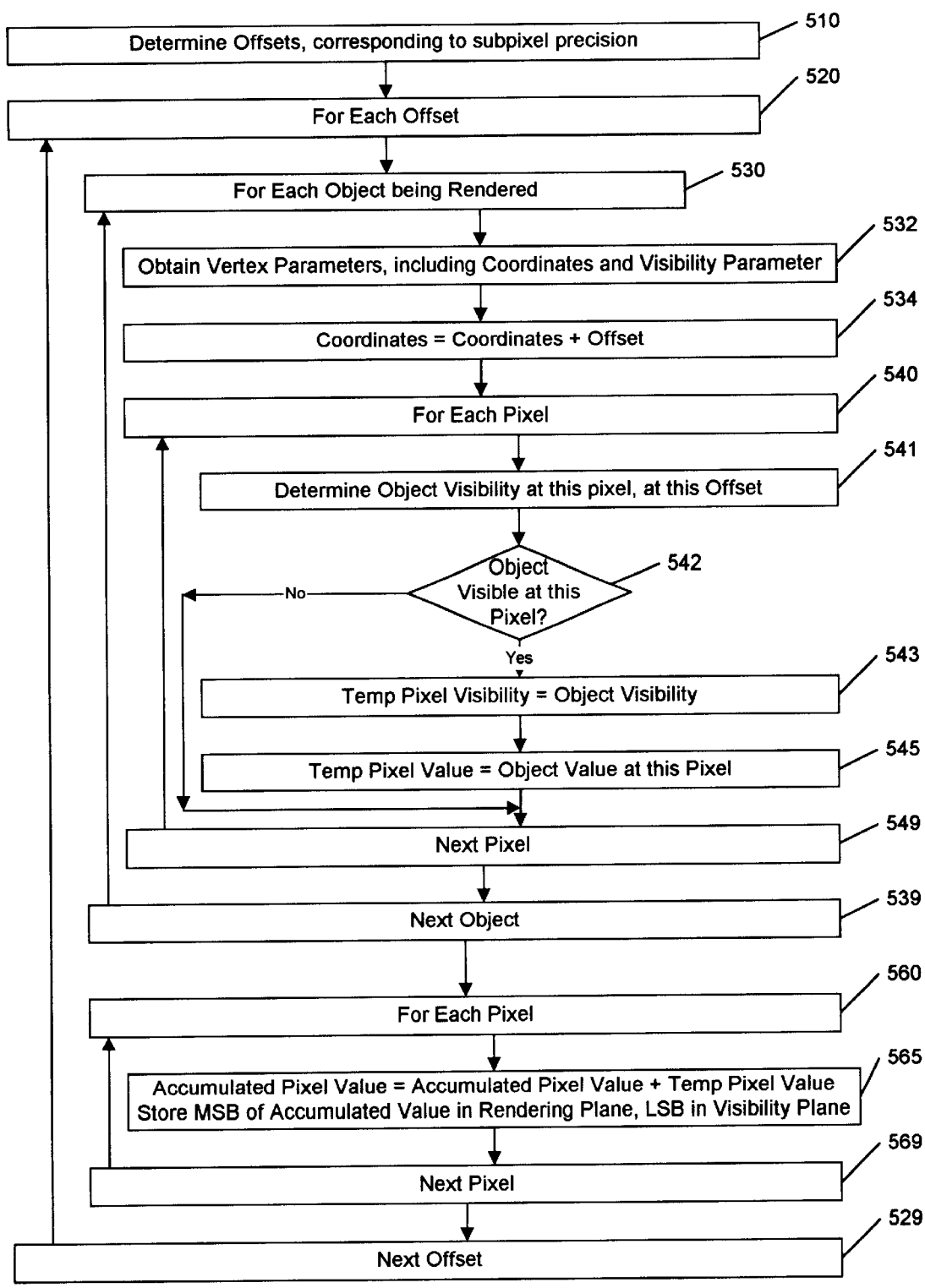
FIG. 6 illustrates a method for accumulating and storing pixel values for renderings of multiple objects at subpixel resolution in accordance with this invention.

FIG. 6 illustrates a full screen anti-aliasing process that does not require multiple sampling of a composite image. The starting block 510 generates a set of offsets corresponding to the desired subpixel resolution, similar to block 415 of FIG. 4. The loop 520–529 iteratively processes the objects for each of these offsets. The loop 530–539 within the loop 520–529 processes each of the objects being rendered. Block 532 obtains the current object's vertex parameters, including visibility, as well as the intended coordinates for the vertices. Block 534 applies the current offset to the current block's location coordinates. Each of the pixels are processed in the loop 540–549. Optionally, this loop 540–549 could be structured to only process those pixels that lie within the bounds of the object, as determined by the extent of the object's vertices. At 541, the object's visibility at this pixel, relative to the object being placed at the current offset, is determined. If, at 542, the object is not visible at the current pixel, no actions are taken for this pixel. To determine visibility, the object's visibility, or z-axis, value at this sampling point is compared to the temporary visibility value currently associated with the pixel. If, at 542, the current object's visibility value is less than the current pixel's temporary visibility value, indicating that it is closer to the view point than any prior processed object, the current object's visibility value is stored as the current pixel's temporary visibility value, at 543. Subsequent objects' visibility values are compared to this newly stored temporary visibility value to determine which object is finally visible at this pixel. As each object is determined to be visible, the pixel value corresponding to the visible object is stored as the temporary pixel value for this pixel, replacing any other, now non-visible, object's pixel value for this pixel, at 545. After processing all the objects, via the loop 530–539, the temporary pixel value for each of the pixels will contain the pixel value of the most visible object at each pixel, at the current offset. The temporary pixel value for each pixel, corresponding to all the objects being placed at the current offset, is the subpixel sample for each pixel. The temporary pixel value for each pixel is accumulated and the resultant accumulated value is stored in the loop 560–569. At block 565, each pixel's temporary pixel value is added to the pixel's accumulated value. In a preferred embodiment, the MSB of the accumulated pixel value is stored in the rendering plane of memory, and the LSB is stored in the visibility plane, at 565.

Not shown in FIG. 6 is the initialization of variables. For each offset, the temporary pixel value is set to a very high value, to force the first object at each pixel to be determined to be visible. Alternatively, within the loop 540–549, the first object processed at each pixel can be identified, and the temporary pixel visibility and value set to the visibility and value of the first object. Similarly, for each offset, the accumulated pixel value for each pixel is initialized to 0. Alternatively, in the loop 560–569, the first offset can be identified, and the accumulated pixel value is set equal to the temporary pixel value at the first offset. These and other initialization techniques are known to one of ordinary skill in the art.

In a conventional, non-anti-aliased system, the temporary pixel visibility is stored for each pixel; thus, the storing of this value in the process of FIG. 6 incurs no additional memory resources for this variable. The storing of the temporary pixel value for each pixel does, however, utilize memory resources. Because the rendering plane is utilized to store the MSB of the accumulated pixel value, it is not available to store this temporary pixel value for each pixel. Therefore, the additional memory required for the process of FIG. 6 is equal to the size of the rendering plane. This is equal to the additional memory required to render the entire image as a composite of all the objects forming the image. As discussed above, the process of FIG. 6 is preferred particularly for those applications wherein portions of the entire image are being updated by a subset of the total number of objects forming the image.

Figure 7:
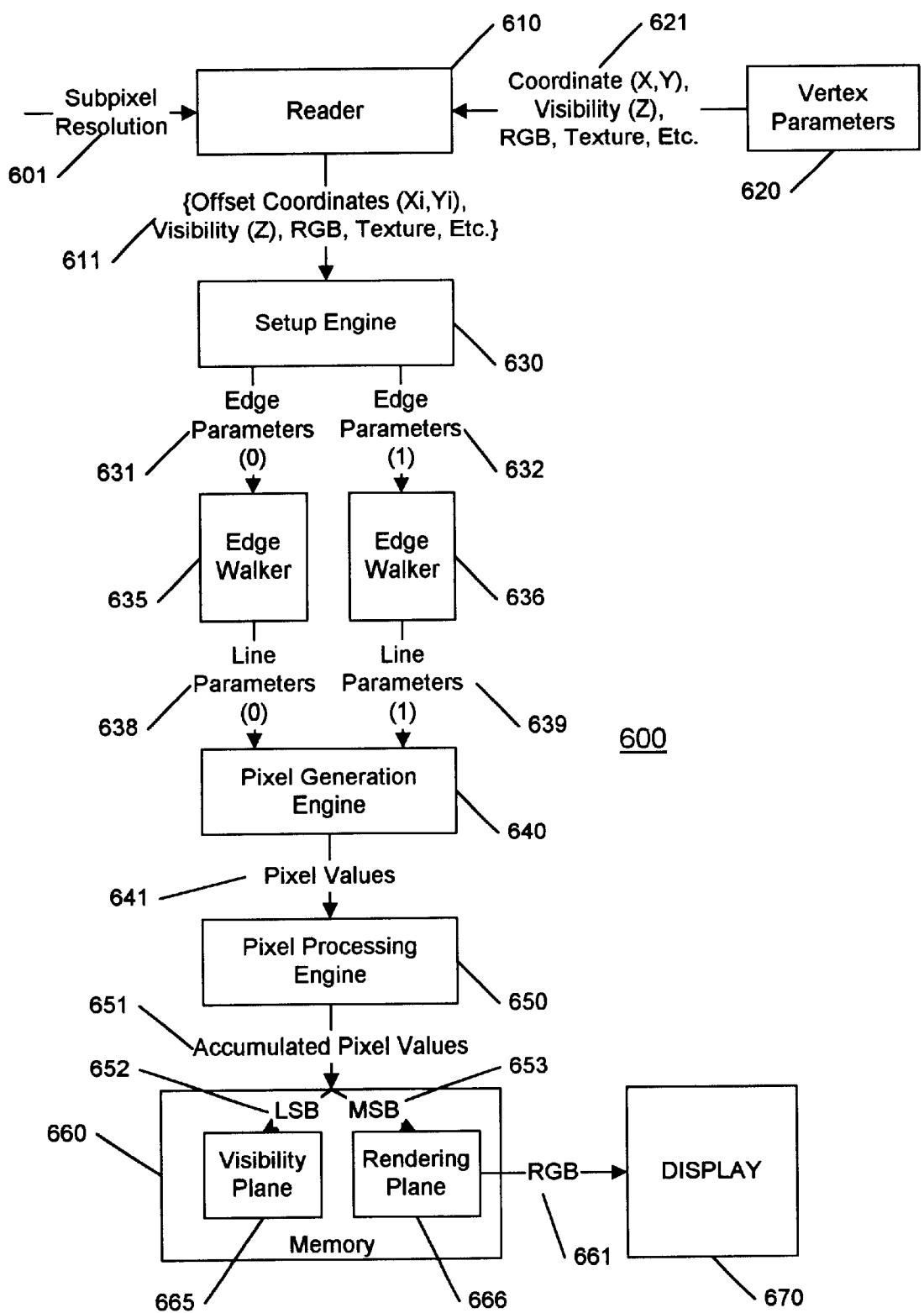
FIG. 7 illustrates another video processing system for accumulating and storing pixel values for renderings of multiple objects at subpixel resolution in accordance with this invention.

FIG. 7 illustrates a video graphics device 600 that provides for anti-aliasing a computer generated scene. The video graphics device 600 includes a reader 610, setup engine 630, edge walkers 635, 636, pixel generation engine 640, pixel processing engine 650, and memory 660. The reader 610 obtains the vertex coordinates and parameters 621 associated with an object from the vertex parameters storage area 620. The reader 610 also receives a subpixel resolution parameter 601. Reader 610 generates a set of parameters 611 based upon a set of subpixel based offset coordinates and the object's vertex coordinates. That is, if the object is a triangle, having three vertices, and there are four subpixels per pixel, the reader 610 will generate a set of four triangles, the vertices of each being offset by ¼ of the pixel size. Associated with each of the vertices of each of these four triangles will be the vertex parameters associated with each of the original vertices, as read from the vertex parameter storage block 620. That is, the set of parameters 611 describing each of the offset objects will be identical to parameters 621, except for their location coordinates. If multiple potentially overlapping objects are being processed, as in the process of FIG. 6, the reader 610 generates the entire set of multiple objects at each offset. That is, if there are 5 objects and 4 offsets, the reader 610 will generate 4 sets of 5 objects. Each set of 5 objects will be offset by the subpixel precision offset.

The setup engine 630 processes each of the set of parameters 611 sequentially. The setup engine 630 produces edge parameters based upon the vertices of the object being rendered. For example, if the color value at two vertices which form an edge of the object differ, the edge parameters describe how the color value changes along the edge. Two sets of edge parameters 631, 632 describe, for example, the left and right edges of the object. The edge walkers 635, 636 use the edge parameters 631, 632 to describe a set of line parameters 638, 639 to define the starting and ending values of a set of lines forming the area between the edges of the object. The pixel generation engine 640 uses the line parameters 638, 639 to determine the value of each pixel between the start and end of each line forming the area between the edges of the object. The pixel generation engine 640 may also include processing to adjust the pixel values to account for lighting effects, texture, and the like.

The pixel processing engine 650 produces an accumulated pixel value 651, as discussed above, by combining the current value of each pixel with the value of the pixel accumulated by prior placements of objects at this pixel. If the video graphics device 600 is being used to process multiple potentially overlapping objects, as in FIG. 6, the pixel processing engine 650 will store the value of the visible object at each pixel in a temporary buffer (not shown). The accumulated pixel value will be an accumulation of the value of each pixel stored in the temporary buffer after all the objects at the current offset are processed, consistent with the process illustrated in FIG. 6.

A portion 653 of the accumulated pixel value is preferably stored in the rendering plane 666 of memory 660. This rendering plane 666 is the memory area that provides pixel information to the display 670 for subsequent display. As is common in the art, the rendering plane may consist of two planes. The pixel processing engine 650 stores to the first plane while the display accesses the second plane, then the display switches to the first plane and the pixel processing engine 650 stores to the second plane, and the cycle repeats. Optionally, the RGB components 661 may be processed for storage in a format suitable for subsequent processing or display.

The portion 652 of the cumulative pixel value 651 not stored in the rendering plane 666 is stored in another area of memory 660. As discussed above, the use of the visibility plane memory 665 for this purpose minimizes additional memory accesses, because the visibility plane memory 665 is accessed for visibility information for each pixel. Also as discussed above, an embodiment of this invention which utilizes a subpixel resolution 601 which is a power of two allows for the elimination of an explicit divider or shifter to form the average of the accumulated pixel values. As shown in FIG. 7, the portion 653 of the accumulated pixel value 651 which is stored in the rendering plane 666 is the most significant bits (MSB) of the accumulated pixel value 651.

Note that although the rendering plane 666 is shown to provide red, green, and blue components, RGB 661, this invention is equally well suited for pixel values having a different set of component values. For example, for rendering on a black and white display, or printer, the pixel value may comprise a single intensity value, white and black being at opposite ends of the intensity scale, and intermediate values corresponding to multiple shades of gray.

The foregoing discussion has described a method and apparatus for anti-aliasing that minimizes the additional memory required for subpixel sampling, and minimizes the processing required to determine and store the resultant pixel value based on the multiple subpixel samples. It will be appreciated that those of ordinary skill in the art will be able to devise various arrangements which, although not explicitly described or shown herein, embody the principles of the invention and are thus within its spirit and scope. For example, the subpixel sampling can be implemented as a combination of both the direct subpixel sampling technique and the object offset sampling technique, wherein the object is placed at multiple offsets, and at each offset, multiple subpixel samples are obtained.

We claim:

1. A method for determining a pixel value for each of a plurality of pixels corresponding to an object, the method comprising the steps of:

determining a plurality of sampled values associated with each pixel corresponding to the object, determining an accumulated value of each pixel based on the plurality of sampled values associated with each pixel, and storing the accumulated value of each pixel as a first portion in a first memory area, and a second portion of the same accumulated value in a second memory area, the first and second memory areas having a plurality of memory locations for containing the first and second portions of the accumulated value of each pixel, respectively, wherein the accumulated value of each pixel includes M bits, the first portion includes M–N most significant bits of the accumulated value and the second portion includes N least significant bits of the accumulated value; and the plurality of sampled values associated with each pixel is equal to $2^N$.

2. The method of claim 1, wherein the plurality of sampled values associated with each pixel are determined by locating the object at a plurality of offsets relative to the plurality of pixels.

3. The method of claim 1, wherein the first memory area is a rendering plane memory.

4. The method of claim 3, wherein the second memory location is a visibility (z) plane memory.

5. The method of claim 1, wherein the object is characterized by a plurality of vertex parameters.

6. The method of claim 5, wherein each of the plurality of vertex parameters includes a location coordinate, and the plurality of sampled values associated with each pixel are determined by offsetting each location coordinate by each of a plurality of offsets relative to the plurality of pixels.

7. The method of claim 6, wherein the plurality of offsets are based on a subpixel precision.

8. The method of claim 5, wherein each of the plurality of vertex parameters includes a visibility parameter, and the determination of the accumulated value of each pixel is dependent upon the visibility parameter of at least one vertex parameter.

9. The method of claim 1, further comprising the step of:

using the first portion of the accumulated value stored in the first memory area for displaying the object.

10. A method for determining a value of a pixel, comprising the steps of:

a) determining a plurality of rendering offset coordinates based on a subpixel precision;

b) obtaining vertex parameters for each object element of a plurality of object elements, the vertex parameters including visibility parameters;

c) rendering the plurality of object elements at the pixel based on the visibility parameters and an initial rendering offset coordinate of the plurality of rendering offset coordinates, the rendering producing a first temporary pixel value;

d) initializing an accumulated value to be equal to the first temporary pixel value;

e) re-rendering the plurality of object elements at the pixel based on the visibility parameters and another rendering offset coordinate to obtain a second temporary pixel value;

f) accumulating the second temporary pixel value with the accumulated value and storing a first and a second portion of the accumulated value in a first memory location and a second memory location, respectively;

g) repeating steps (e) and (f) for each remaining ones of the plurality of rendering offset coordinates; and h) utilizing the first memory location for the value of the pixel for display.

11. The method of claim 10, wherein the accumulated value includes M bits, the first portion includes M–N most significant bits of the accumulated value and the second portion includes N least significant bits of the accumulated value; and, the subpixel precision is equal to $2^N$.

12. The method of claim 10, wherein the first memory location is a rendering plane memory and the second memory location is a visibility plane memory.

13. A video processing system for displaying an array of pixels corresponding to an image object, comprising:

a subpixel sampler operably coupled to receive object values of the image object and to generate therefrom a plurality of samples of the image object corresponding to each pixel of the array of pixels, a pixel value accumulator that accumulates an accumulated pixel value based on the plurality of samples corresponding to each pixel, a first memory area that stores a first portion of the accumulated pixel value corresponding to each pixel, and a second memory area that stores a second portion of the same accumulated pixel value corresponding to each pixel, wherein the accumulated pixel value includes M bits, the first portion of the accumulated pixel value includes M–N most significant bits of the accumulated pixel value and the second portion of the accumulated pixel value includes N least significant bits of the accumulated pixel value; and the plurality of samples corresponding to each pixel is equal to $2^N$.

14. The video processing system of claim 13, wherein the first memory location is a rendering plane memory.

15. The video processing system of claim 14, wherein the second memory location is a visibility (z) plane memory.

16. The video processing system of claim 14, further comprising a display operably coupled to the rendering plane memory for displaying the array of pixels based upon the first portion of the accumulated pixel value corresponding to each pixel.

17. The video processing system of claim 13, wherein the plurality of samples corresponding to each pixel are determined by locating the object at a plurality of offsets relative to the array of pixels.

18. A video processing system comprising:
a memory having a first memory area and a second memory area,
an offset stepper operably coupled to receive coordinates of an object clement and to generate, therefrom, a plurality of offset coordinates based on a subpixel resolution,
a processor operably coupled to receive the plurality of offset coordinates and object parameters, wherein the processor generates a plurality of pixel values corresponding to the object element at each of the plurality of offset coordinates, and wherein the processor accumulates each corresponding pixel value of the plurality of pixel values to produce a plurality of accumulated pixel values, wherein each of the plurality of accumulated pixel values includes a first part and a second part, the first part of the accumulated pixel value being stored in the first memory area and the second part of the same accumulated pixel value being stored in the second memory area, wherein each of the plurality of accumulated pixel values includes M bits, the first part of the a cumulated pixel value includes M−N most significant bits of the accumulated pixel value, and the second part of the accumulated pixel values includes N least significant bits of the accumulated pixel value.

19. The video processing system of claim 18, wherein each of the plurality of accumulated pixel values includes M bits, the first part of the accumulated pixel value includes M−N most significant bits of the accumulated pixel value, and the second part of the accumulated pixel value includes N least significant bits of the accumulated pixel value.

20. The video processing system of claim 19, wherein the subpixel resolution is 2^N.

21. The video processing system of claim 18, wherein the first memory area is a rendering plane.

22. The video processing system of claim 21, wherein the second memory area is a visibility plane.

23. The video processing system of claim 18, wherein each accumulated pixel value includes a red component, a green component, and a blue component, and the first part of each accumulated pixel value includes most significant bits of the red, green, and blue components.

24. The video processing system of claim 18, further comprising a display operably coupled to the first memory area.

25. A video processing system comprising:
a reader that reads a plurality of vertex parameters, and generates a plurality of offset coordinates based on a subpixel resolution,
a setup engine operably coupled to receive the offset coordinates and at least a portion of the vertex parameters from the reader, and wherein the setup engine produces a plurality of edge parameters based on each of the plurality of offset coordinates,
at least one edge walker that processes the plurality of edge parameters to produce a plurality of line parameters,
a pixel generation engine that processes the plurality of line parameters to produce a plurality of pixel values, and
a pixel processing engine that accumulates corresponding pixel values of a plurality of pixel values produced for each of the plurality of offset coordinates to form a corresponding accumulated pixel value and stores a first part of each corresponding accumulated pixel value in a first memory area and a second part of each corresponding accumulated pixel value in a second memory area.

26. The video processing system of claim 25, further comprising a display operably coupled to the first memory area for accessing the first part of each corresponding accumulated pixel value.

27. The video processing system of claim 25, wherein the vertex parameters include coordinate parameters, visibility parameters, color parameters, and texture parameters, and wherein each pixel value includes a red component, a green component, and a blue component based on these vertex parameters.

28. The video processing system of claim 27, wherein the first part of each corresponding pixel value includes most significant bits of the red component, the green component, and the blue component.

29. The video processing system of claim 28, wherein the vertex parameters include visibility parameters, and wherein at each of the plurality of offset coordinates the pixel processing engine determines the plurality of pixel values based on the visibility parameters.

* * * * *